United States Patent Office 3,321,056
Patented May 23, 1967

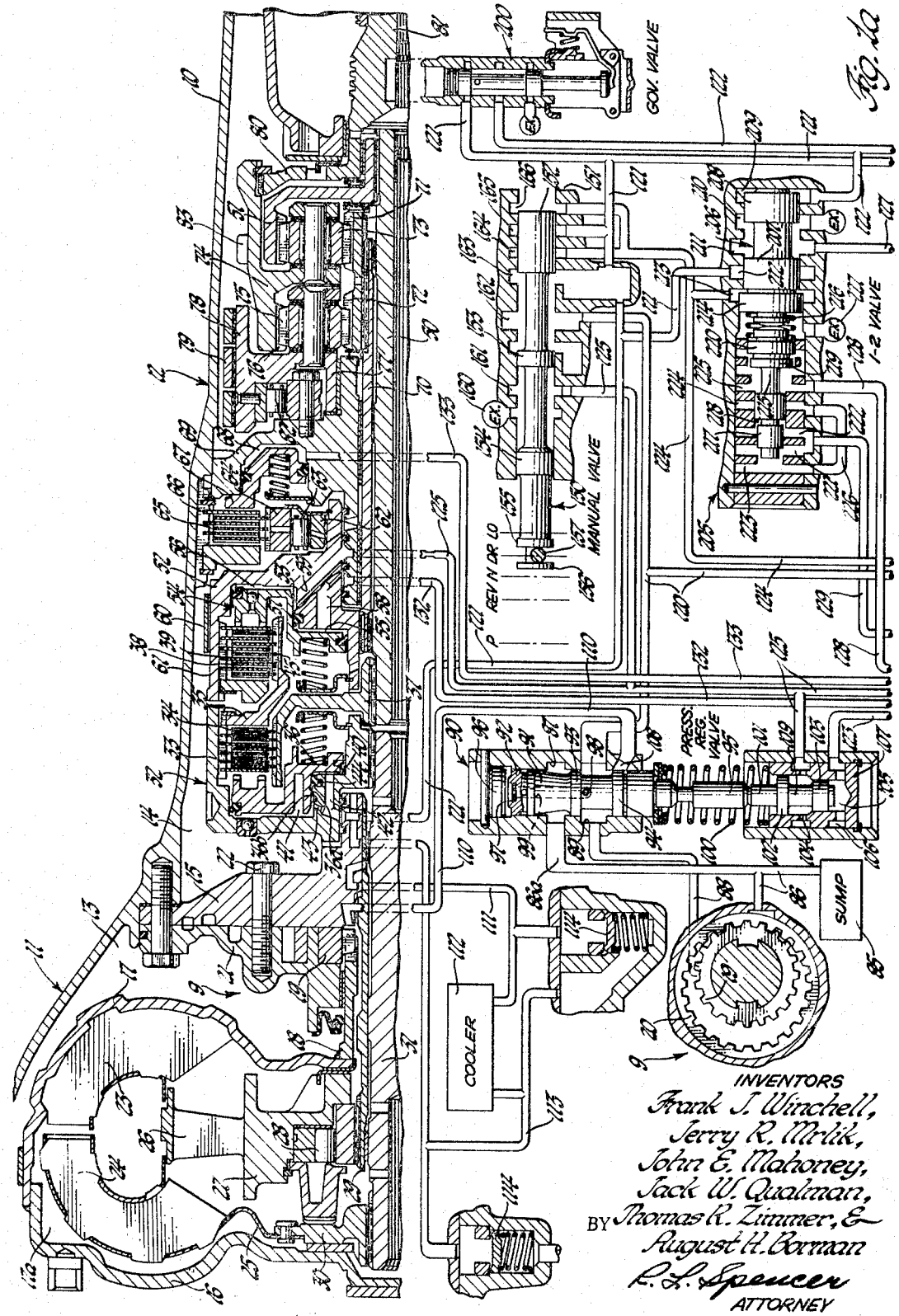

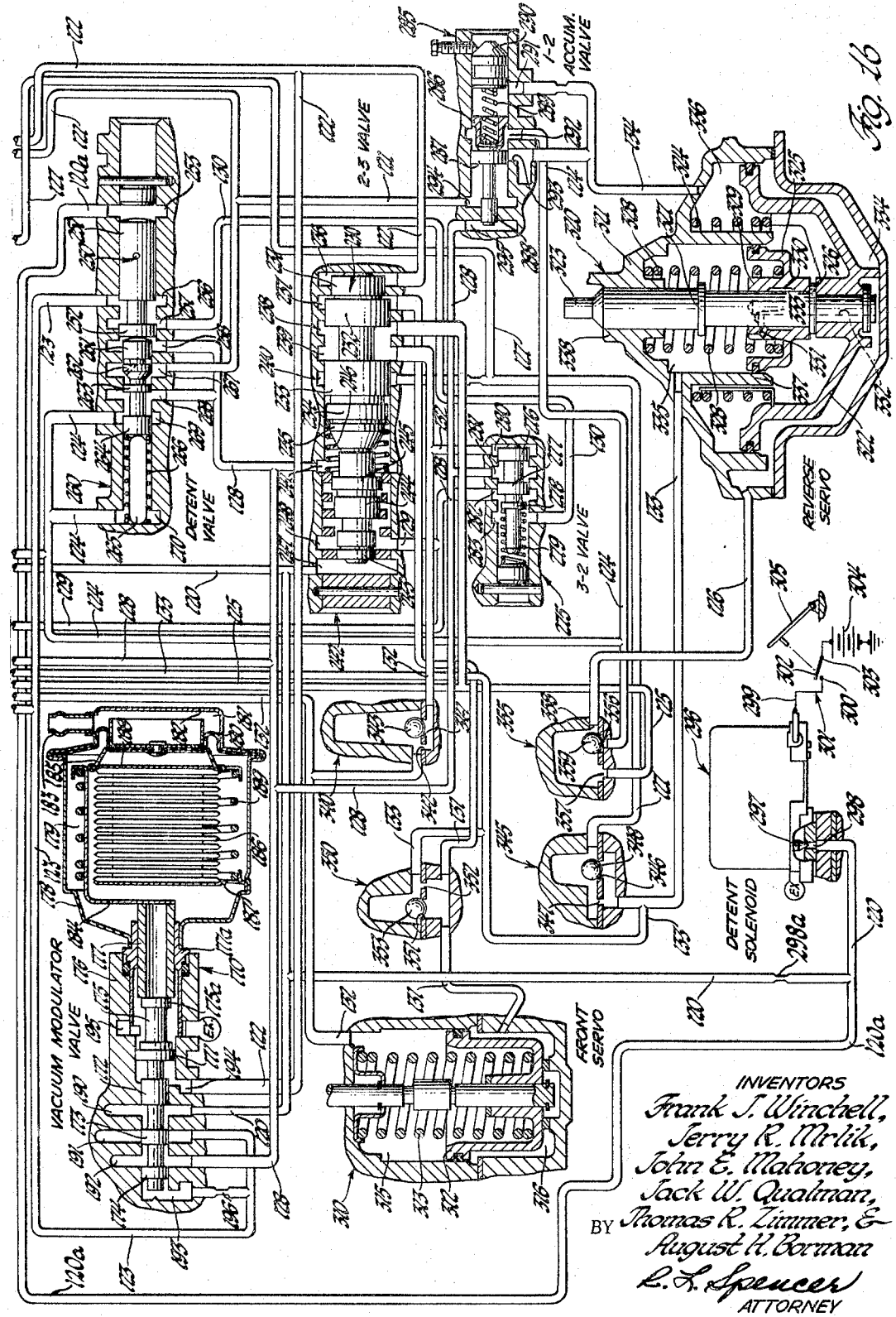

3,321,056
TRANSMISSION AND CONTROL SYSTEM
Frank J. Winchell, Bloomfield Hills, Jerry R. Mrlik, Birmingham, John E. Mahoney, Royal Oak, Jack W. Qualman, Ann Arbor, Thomas R. Zimmer, Livonia, and August H. Borman, Detroit, Mich., assignors to General Motors Corporation, Detroit, Mich., a corporation of Delaware
Filed Dec. 12, 1963, Ser. No. 330,105
6 Claims. (Cl. 192—85)

This invention relates to change speed gearing transmissions and more particularly to improved servo mechanisms adapted to be actuated by fluid pressure and specifically designed to provide smooth engagement of friction engaging members while maintaining adequate torque transmitting capacity. It further pertains to improvements in control systems of the type wherein automatic and manually operated control members are coordinated to produce automatic selection of drive ratio in step-ratio gearing. The invention represents a number of improvements in such control systems whereby a plurality of speed ratio ranges and conditions of operation may be selected to meet the particular requirements of different drive conditions encountered in the operation of a motor vehicle.

An object of this invention is to provide in a transmission of the type having friction gripping members adapted to selectively be engaged and disengaged, an improved fluid pressure responsive servo having a plurality of chambers adapted to receive fluid pressure for engaging the friction gripping member and incorporating means to regulate the rate of fluid flow to at least one of the chambers to provide smooth engagement of the friction engaging members.

Another object of this invention is to provide a fluid pressure responsive servo for engaging and disengaging friction gripping elements incorporating two fluid pressure receiving chambers and control means for directing fluid pressure to one chamber to establish one drive ratio and effective to deliver fluid pressure to both chambers to establish a second drive ratio.

A further object of this invention is to provide in a control system for a transmission incorporating valving for shifting drive ratio, an accumulator and an accumulator control valve automatically operable to deliver pressure to the accumulator to regulate the pressure supplied to the accumulator piston at a predetermined pressure less than the line pressure supplied to the transmission drive establishing servo to insure smooth engagement of friction engaging elements in the drive establishing servo.

An additional object is to provide in a transmission control system having shift valves movable to establish change of drive ratio and a pressure modulator valve adapted to deliver variable pressure which varies with changes in torque demand, and having passage means for delivering the variable pressure to the shift valve, valve means in the passage means effective in one position to deliver the modulated pressure to the shift valves and effective in a second position to block off the shift valves from modulator pressure and to connect the modulator pressure previously directed to the shift valves to exhaust.

A particular object of this invention is to provide a valve for controlling admission of modulator pressure to and exhaust of modulator pressure from the control system shift valves normally effective in second gear drive to direct modulator pressure to the shift valves and movable in response to pressure delivered to a direct drive clutch servo to connect the passage for conducting the modulator pressure to the shift valves to exhaust, at light throttle or torque demand conditions of operation, and effective at heavy throttle conditions of operation to direct modulator pressure to the shift valves.

A further object of this invention is to provide in a control system for a transmission of the type having a friction gripping element adapted to be engaged and released and having a servo piston for engaging the element in response to fluid pressure supplied thereto, a shift valve having a downshift position and an upshift position for controlling supply of pressure to and exhaust of pressure from the servo piston, a modulator valve normally effective to deliver variable pressure to the shift valve tending to downshift the valve, a modulator pressure cutoff valve normally effective to deliver modulator pressure to the shift valve and movable in response to pressure delivered by said shift valve in its upshift position to block off the shift valve from the modulator pressure at light torque demand conditions of operation and movable at heavy torque demand conditions of operation to deliver modulator pressure to the shift valve when said shift valve is in its upshift position.

Another object of this invention is to provide in a transmission control system having a shift valve for controlling transmission drive ratio, a detent valve, a detent control valve and a detent regulator valve effective for controlling detent pressure supplied to the shift valve normally effective to reduce the detent pressure to zero and effective under control of the vehicle operator to deliver a fixed detent pressure less than line pressure to the shift valve when operating in drive range condition of operation and effective in low range condition of operation to deliver full line pressure to the shift valve tending to downshift the shift valve.

An additional object of this invention is to provide in a transmission control system having a rotatable member adapted to be braked against rotation and having first and second fluid pressure responsive servo pistons for engaging first and second brakes, respectively, a shift valve effective in a downshift position to connect both of said servo pistons to exhaust and effective in an upshift position to deliver pressure to both of said servos, first means for restricting fluid flow from said shift valve to both of said servo pistons and for permitting unrestricted fluid flow from both of said servo pistons to said shift valve and second means for restricting fluid flow from said shift valve to one only of said servo pistons and for permitting unrestricted fluid flow from said one servo piston to said shift valve.

A further object of this invention is to provide in a transmission control system for controlling admission of fluid pressure to and exhaust of pressure from a fluid pressure responsive servo piston, a shift valve, a drive range selector valve adapted to select drive range and low range conditions of operation, a modulator valve adapted to deliver variable modulator pressure which varies with torque demand in drive range operation to the shift valve, a modulator pressure cutoff valve effective in drive range operation to deliver modulator pressure to the shift valve when the shift valve is in one position and to cut off modulator pressure from the shift valve at light torque demand when the shift valve is moved to a second position and to direct modulator pressure to the shift valve under heavy torque demand when the shift valve is in its second position.

Still another object of this invention is to provide in a control system for a transmission having a drive range selector valve adapted to select drive range and low range operation and having a shift valve for controlling the transmission drive ratio, a modulator valve normally operable to deliver variable pressure which varies with torque demand to provide a detent regulator valve and a detent valve normally effective in drive range operation to deliver the modulator pressure to the shift valve, effective under detent drive range condition of operation to regulate the modulator pressure at a fixed pressure less than line pressure, and effective under low range operation to regulate the modulator pressure at full line pressure.

An additional object of this invention is to provide in a transmission control system, an accumulator having a piston, a first chamber at one side of the piston, a second chamber at the opposite side of the piston, an accumulator control valve for controlling pressure in the first chamber normally effective in drive range operation to deliver reduced line pressure to the first chamber and effective in low range operation to deliver full line pressure to the first chamber and to provide a shift valve effective in one position to connect a servo piston and the second accumulator chamber to exhaust and effective in a second position to deliver line pressure to the second accumulator control chamber and to the servo piston.

Another object of this invention is to provide in a transmission control system having a drive range selector valve movable to select drive range and low range operation, a modulator valve normally operable to deliver variable pressure which varies with torque demand, when operating in drive range, a detent valve and detent regulator valve normally operable in drive range to permit exhaust of excess pressure from the modulator valve when operating in drive range and to control minimum modulator pressure and detent pressure at a fixed pressure less than line pressure under drive range detent conditions of operation, and effective to control modulator pressure and detent pressure at line pressure when operating in manual low range operation.

These and other objects and advantages of this invention will be apparent from the following specification and drawings, in which:

FIGURE 1a is a schematic drawing of a transmission and a portion of the control valving incorporated in the transmission control system.

FIGURE 1b is a schematic diagram of the remainder of the control system including valving and brake band actuating servos and an accumulator.

Referring to FIGURE 1a, there is shown the transmission gearing arrangement adapted to provide three speeds forward and reverse. The transmission includes casing 10 enclosing a hydrodynamic torque transmitting unit indicated generally at 11 and a planetary gearing unit indicated generally at 12 and disposed in compartments 13 and 14 separated by an inwardly extending support member 15. An engine driven housing cover 16 and an impeller cover 17 fixed to cover 16 enclose a fluid chamber 17a. Cover 17 is connected to drive a pump gear 19 by means of a sleeve 18 to drive gear 19 whenever the vehicle engine is operating, the pump being positioned in a pump cover 21 bolted to support 15 by bolts 22.

The hydrodynamic torque transmitting unit 11 includes a series of impeller vanes 23, a turbine vane support member 25 having turbine vanes 24 thereon, and a reaction hub 27 having reaction vanes 26 thereon disposed intermediate the fluid discharge of the turbine and fluid entrance to the impeller. Hub 27 and vanes 26 are permitted free forward rotation by means of a one-way brake 28 disposed between hub 27 and a ground sleeve 29 grounded to support member 15. One-way brake 28 prevents reverse rotation of vanes 26 and hub 27 under influence of circulatory working fluid. A turbine hub 30 fixed to member 25 is splined to a transmission power input shaft 31 to drive the shaft. A clutch housing 32 is spilned to shaft 31 for rotation therewith. A series of clutch discs 33 and clutch discs 34 are adapted to be engaged when forced against a cltuch disc backing member 35 by means of a piston 36. Discs 33 are splined for axial movement on clutch housing 32 and clutch discs 34 are splined for axial movement on a clutch hub 37.

It is important to note that clutch housing 32 is shaped to provide an axially extending cylindrical surface indicated at 36a and that a clutch apply piston is shaped to provide an annular cylindrical surface 36b contacting surface 36a such that the piston and clutch housing cooperate to form two chambers 40 and 41 adapted to receive fluid under pressure. The chambers 40 and 41 are of different size. The relatively small chamber 40 may be supplied with fluid through a relatively unrestricted passage 42, while the large chamber 41 is supplied with fluid through a restriction 43. A seal 44 disposed between the annular cylindrical surface 36b of piston 36 and the axially extending cylindrical surface 36a of housing 32 will prevent flow of fluid under pressure from the chamber 40 to chamber 41 during application of the clutch, but will permit flow of fluid from chamber 41 to chamber 40 during release of the clutch. This particular arrangement including the restriction 43 and one-way seal 44 results in very smooth engagement of the clutch discs 33, 34, and also provides for rapid exhaust of fluid and consequent quick release of the clutch discs when release of the clutch is desired, to prevent clutch drag.

It will be understood that in the clutch engaging action upon introduction of fluid under pressure to piston 36, that the relatively small chamber 40 will fill much more rapidly than the relatively large chamber 41. Thus, initial engagement of the clutch discs 33 and 34 will be accomplished by axial movement of the piston resulting primarily from pressure effective in chamber 41. Once the clutch discs are in contact and axial movement of the piston is resisted, pressure entering the large chamber 41 through restriction 43 will become effective upon the relatively large area of the piston to retain the clutch discs in non-slipping friction engagement. On the other hand, during release of the clutch, seal 44 acts as an open valve to permit flow of fluid from chamber 41 to chamber 40 past the seal to provide a by-pass around restriction 43. This improved clutch engaging action and rapid clutch release feature is one of the important improved features in the transmission.

Considering the transmission structure further, clutch hub 37 is splined to an intermediate shaft 50 for driving shaft 50 when clutch 33–34 is engaged, there being a ring gear 51 splined to shaft 50 for rotation therewith. A series of clutch discs 38 splined on an extension of clutch backing member 35 are adapted to be engaged to and released from clutch discs 39 splined to a clutch drum 52. Clutch drum 52 is shaped to include an axially extending cylindrical surface 53 which cooperates with a piston 54 to provide two chambers 55 and 56 adapted to receive fluid pressure for engaging clutch discs 38–39. Chamber 55 which is smaller than chamber 56 is supplied with fluid for direct drive forward application. Chamber 56 is supplied with fluid for reverse operation. A seal 57 prevents flow of fluid from chamber 55 to chamber 56, but permits flow of fluid from chamber 56 to chamber 55. As will be further explained later herein, only the chamber 55 is used for applying clutch 38–39 to establish direct drive, while both chambers 55 and 56 are supplied with fluid to establish reverse. This arrangement provides for smooth direct drive clutch engagement wherein the torque handling requirements for the clutch are relatively small as compared to the torque handling requirements in reverse. The ararngement also provides adequate torque capacity when establishing reverse drive. Pressure may be admitted to chamber 55 through a passage 58 and to chamber 56 through a passage 59 formed in clutch drum 52.

A brake band 60 is provided on the external cylindrical surface 61 of clutch drum 52 and may be engaged upon surface 61 to prevent rotation of clutch drum 52 when operating in overrun in second gear. This is particularly useful for providing downhill braking in second gear drive to avoid excessive wear of the vehicle brakes. Clutch drum 52 carries a race 62 adapted to be gripped by a one-way brake sprag 63. A second race 64 is held against rotation upon engagement of brake discs 65 with brake discs 66. Discs 65 are splined for axial movement on hub 64 and discs 66 are splined for axial movement on housing 10. The brake 65–66 may be applied by a piston 67 in response to pressure in a chamber 68 formed by piston 67 and a support 69 fixed to housing 10. With the brake 65–66 engaged, one-way brake 63 is effective to prevent reverse rotation of clutch drum 52 and to permit forward rotation of drum 52. Brake 65–66 is engaged in second gear and direct drive operation. The second gear overrun band 60 is necessarily applied only when operating in second gear for overrun braking and is not necessary for the establishment of second gear drive. Clutch drum 52 is splined to a sleeve shaft 70 which in turn is splined to a pair of sun gears 71 and 72. A planet carrier 74 supports a planet gear 73 in mesh with a sun gear 71 and ring gear 51 and also supports a ring gear 76. A second planet carrier 77 supports a planet gear 75 in mesh with sun gear 72 and ring gear 76. A cylindrical surface or brake drum 78 on carrier 77 may be engaged by a brake band 79 for preventing rotation of planet carrier 77. Band 79 is applied to establish reverse drive and low range forward operation. Planet carrier 74 and ring gear 76 rotate as a unit with a power delivery shaft 81 connected to carrier 74 by a flange 80. A one-way brake 82 is disposed between brake drum 78 and fixed support 69. A parking brake pawl (not shown) may engage a tooth 83 on carrier 74 to lock shaft 81 against rotation when parking the vehicle.

*Operation of the general arrangement*

The transmission so far described affords neutral, three forward drive ratios, and a reverse drive ratio. As will further be explained, two forward drive ranges referred to as drive range and low range are available.

For neutral, all of the clutches and brakes are released and no power from power input shaft 31 can be transmitted to the planetary gearing through either shaft 50 or shaft 70.

In drive range operation, three forward drive ratios may be obtained, including first or low gear drive, second gear drive and direct drive. Forward drive range, low gear is obtained by engaging forward drive clutch 33–34. Power from input shaft 31 is delivered to ring gear 51 through clutch 33–34, and shaft 50 to drive ring gear 51 forwardly. Due to the load of the vehicle on planet carrier 74, the carrier tends to remain stationary so that sun gears 71, 72 are driven reversely. Power input to planet gear 75 from sun gear 72 tends to cause planet carrier 77 to spin but such rotation of carrier 77 is prevented by one-way brake 82. Planet gear 75 therefore drives ring gear 76 forwardly. In low gear, drive is at the compound reduction of both planetary gearing units. Due to the action of one-way brake 82, the transmission will freewheel on overrun when operating in drive range, low gear.

Drive range, second gear drive is accomplished by retaining forward drive clutch 33–34 engaged and by applying disc brake 65–66. As will hereafter be explained, second gear overrun brake band 60 is also applied to provide overrun braking when operating in second gear. Second gear drive is established, however, through action of disc brake 65–66 to render one-way brake 63 (in series with brake 65–66) effective to prevent reverse rotation of clutch drum 52 and sun gears 71, 72. In second gear drive, power is applied to ring gear 51, sun gears 71 and 72 are held against rotation, and carrier 74 is driven forwardly at the reduction ratio of the gear unit 51, 73, 71. One-way brake 82 on carrier 77 releases to permit carrier 77 to spin freely.

Drive range direct drive is accomplished by maintaining clutch 33–34 engaged, maintaining brake 65–66 engaged, releasing second gear overrun band 60, and applying direct drive clutch 38–39. One-way brake 63 in series with brake 65–66, permits forward rotation of clutch drum 52 and drive of sun gears 71–72. Since both ring gear 51 and sun gear 71 are driven at the same speed, the gear unit 51–73–71 is locked up and drives carrier 74 in direct drive. Since carrier 74 and sun gear 72 are driven at the same speed, the gear unit 72–75–76 is locked up and drive of output shaft 81 is direct drive without gear reduction.

In low range operation, only two forward drive ratios are available, namely, first gear and second gear drive. Low range is used primarily for overrun or downhill braking. Accordingly, downhill braking, in low range operation is provided both in first gear and second gear drive. For low range, first gear, clutch 33–34 and reverse band 79 are engaged. Drive through the transmission is the same as drive range, first gear. However, band 79 prevents rotation of carrier 77 on overrun so that engine braking can be had. Low range second speed drive is the same as drive range second speed drive wherein clutch 33–34, brake 65–66 and overrun band 60 are engaged.

For reverse drive, the forward drive clutch 33–34 is released, brake 65–66 is released, clutch 38–39 is engaged, band 60 is released, and reverse brake band 79 is engaged. Drive is through clutch 38–39 to drum 52, through sleeve shaft 70 to sun gears 71–72. Since forward drive clutch 33–34 is released, the gear unit 71, 73, 51 has no reaction point and ring gear 51 freely spins. Carrier 77 is held by brake band 79 and planet gear 75 drives ring gear 76 and output shaft 81 in reverse.

*Control system*

The various brakes and clutches are all operated in the proper sequence by the hydraulic control system shown schematically in the drawing.

Fluid pressure for the control system is supplied by an engine driven pump indicted generally at 9 having an engine driven gear 19 mating with a gear 20. Oil is drawn from a sump 85 through a suction passage 86 connected to the pump and to a port 87 of a line pressure regulator valve, the latter connection being through a branch passage 86a. Oil under pressure from the pump is delivered through passage 88 to a port 89 of the pressure regulator valve indicated generally at 90. Pressure regulator valve 90 includes a movable valve member 91 having three spaced lands 92, 93 and 94 of equal diameter and a stem 95 formed thereon. A plug 96 blocks off one end of the valve bore to form a closed member 97 at one end of the valve. Chamber 97 is supplied with fluid through passages 98–99 formed in valve member 91. Valve member 91 is biased toward plug 96 by a spring 100. An additional plug 101 having spaced lands 102 and 103 of different diameters formed thereon contacts stem 95 and acts in assistance to spring 100 in a manner hereafter more fully described. Fluid under pressure may be admitted to the space between lands 102 and 103 when operating in reverse to boost the line pressure, by means of a reverse boost supply passage 125 and a port 104. Fluid pressure may also be admitted to a chamber 105 beneath land 103 from a modulator pressure passage 123 through a port 106. A plug 107 blocks off the end of the valve bore to form chamber 105. Pressure delivered to chamber 105 normally varies as a function of intake manifold pressure and vehicle speed as hereafter more particularly explained. In general, when operating in forward drive, the pressure admitted to chamber 105 decreases as vehicle speed increases and increases with increase in torque demand.

A rise of pressure in chamber 97 will force the valve member 91 to move toward spring 100 to open a port 108 connected to a converter feed supply passage 110 to supply fluid to passage 110. If excess pressure exists in chamber 97, intake port 87 will also be opened by land 93 to permit fluid flow from port 89 to port 87 and branch 86a of intake passage 86.

Fluid under pressure is supplied to the torque converter through a passage 110 and returned from the converter through a passage 111. Passage 111 is connected to a transmission lubrication supply passage 113 through an oil cooler 112. A lubrication pressure blowoff valve 114 maintains a desirable lubrication pressure in passage 113. An oil cooler by-pass valve 114 in converter return passage 111 may at times by-pass the oil cooler to permit oil from passage 111 to enter passage 113 without passing through the cooler. This valve will be effective when the oil is cold to by-pass the oil cooler.

Manual valve

A main line pressure supply passage 120 extends from port 89 of the line pressure regulator valve 90 to a manually operable drive range selector valve designated generally at 150 in FIGURE 1a which is slidable within a bore in the valve body 151 and includes lands 152, 153 and 154. A pair of spaced flanges 155 and 156 are provided for receiving an actuating pin 157 which may be moved by linkage mechanism, not shown, operable by the vehicle driver to position the valve 150 for Park, Reverse, Neutral, Drive Range or Low Range conditions of operation. Valve body 151 is provided with ports 160, 161, 162, 163, 164, 165 and 166. Port 160 is an exhaust port and the remainder of the ports connect to fluid passages as hereafter described.

Vacuum modulator valve

Line pressure supply passage 120 extends to a modulator valve 170 having lands 171, 172, 173 and 174 on a stem 175 slidable in a bore in a valve body 176. A sleeve 177 slidable in a housing 177a seats upon a raised land 175a on one end of stem 175. A casing 178 encloses a chamber 179 connected to atmosphere through a suitable opening in the casing (not shown). A diaphragm 180 extends across one end of chamber 179 to separate chamber 179 from a chamber 181 formed by a cover 182. A nipple 183 on cover 182 is connected to an engine intake manifold, not shown, by tubing, not shown. Sleeve 177 is a loose piece which abuts a strap 184 connected to diaphragm 180 by means of a diaphragm connector 185. Thus, the sleeve 177 and diaphragm 180 move as a unit. An evacuated bellows 186 has one end fixed to housing 178 by means of a seat 187 fixed to the bellows and housing. Diaphragm connector 185 is fixed to the opposite end of the bellows through a bellows seat 188. A spring 189 seated upon seat 187 and upon seat 188 tends to expand the bellows and to move strap 184 and sleeve 177 to the right as viewed in the drawing. Valve body 176 may be an integral part of the transmission case.

Maximum vacuum will occur in chamber 181 when the engine idles with the carburetor throttle valve closed. Under this condition of operation the diaphragm 180 will exert maximum force on bellows 186 tending to expand the bellows and move strap 184 toward the right as viewed in the drawing to permit the sleeve 177 and valve stem 175 to move to the right. If the engine carburetor valve is opened in response to demand for engine power, vacuum in chamber 181 will decrease such that bellows 186 will tend to collapse and move the strap 184 and sleeve 177 and valve stem 175 to the left as viewed in the drawings.

It is desirable that the range of pressure delivered by the pressure modulator valve be the same for a given condition of operation irrespective of change of altitude at which a vehicle is operated. As the altitude at which the vehicle is operated increases, the vacuum available in chamber 181 becomes less with increase in altitude. Thus at high altitude diaphragm 180 is unable to exert the same force on connector 185 for a given throttle opening than it can exert for the same throttle opening at sea level. At the same time the atmospheric pressure in chamber 179 tending to maintain the bellows in a collapsed condition diminishes with increase in altitude. The spring therefore becomes effective to expand the bellows and exert a force on connector 185 which is equal to the loss of force exerted by the diaphragm due to loss of available vacuum at higher altitudes for a given engine throttle opening. Thus, the force generated by the bellows and acting on sleeve 177 and valve stem 175 to move these members to the left as viewed in the drawing is unaffected by altitude changes. The arrangement therefore provides an altitude compensated pressure modulator.

Valve body 176 is provided with ports 190, 191, 192, 193, 194 and 195. Line pressure is admitted to port 190 from passage 120. Governor pressure which increases with vehicle speed is admitted to port 194 from a governor pressure delivery passage 122. Land 171 is of larger diameter than land 172 so that governor pressure exerts a force on the movable modulator valve tending to move the valve to the right as viewed in the drawing to position land 173 to block off port 191 from port 190. Port 191 connects to a modulator pressure delivery passage 123 branched to connect to the end of land 174 through port 193. A restriction 196 is placed in the branch passage to prevent momentary pressure variations in passage 123 from affecting operation of the valve. Port 192 connects to a detent passage 128 which normally is connected to exhaust and acts as an exhaust passage for excess pressure from passage 120 and enables the modulator valve to regulate pressure in modulator passage 123. Thus, the modulated pressure in passage 123 normally decreases with increase in vehicle speed, normally decreases with decrease in torque demand, normally increases with increase in torque demand, and is unaffected by altitude changes. Modulator pressure in passage 123 is directed to port 106 of regulator plug 109 to increase line pressure upon increase of modulator pressure in passage 123. Modulator pressure is also directed through passage 123 to a detent valve 250 for purposes hereafter more fully explained.

Line pressure from passage 120 is also conducted directly to one end of a second to third speed shift valve modulator plug 242, to a detent solenoid valve 296 and to one end of a detent valve 250 for purposes hereafter more fully explained.

With the manual valve 150 positioned in drive range, fluid pressure from passage 120 is conducted through ports 162 and 163 to a drive passage 121. Passage 121 conducts line pressure to a governor 200 to an accumulator control valve 285, to a detent regulator valve 260, to clutch piston 36, to engage clutch 33–34, to port 165 of the manual drive range selector valve, and to a first to second shift valve 206.

Governor

A governor 200 driven by transmission output shaft 81 and responsive to vehicle speed may be of the type fully disclosed and described in the patent to M. S. Rosenberger 2,762,384 issued Sept. 11, 1956. In view of the disclosure of the Rosenberger patent, it is sufficient to state that governor 200 receives line pressure from passage 122 and delivers variable pressure to a governor pressure delivery passage 122. The pressure in passage 122, which increases with increase in vehicle speed is conducted to one end of a first to second shift valve 206, to one end of a second to third shift valve 230 and to port 194 of the vacuum modulator valve.

Upon movement of drive range selector valve 150 to its forward drive low range position, line pressure from line pressure supply passage 120 is admitted to a low range passage 124 and is delivered to the first to second shift valve 206 tending to move the shift valve to its upshift position, to two ports 269 and 270 of a detent regulator valve 260, to a port 292 of a first to second accumulator control valve 285, and to a reverse or low range brake servo 320 by way of a ball valve 355 and a reverse or low range passage 126.

With the drive range selector valve 150 moved to its reverse position, line pressure is admitted from line pressure supply passage 120 to a reverse pressure passage 125 by way of ports 162 and 161. Low range passage 124 is connected to exhaust through port 166. Reverse oil in reverse passage 125 is conducted to port 104 of the line pressure regulator plug to boost line pressure in reverse, to a port 238 of second to third shift valve 230, to chamber 56 of direct drive clutch 38–39 to engage the clutch, and through ball valve 355 to reverse or low passage 126 to the reverse or low range servo to engage brake band 79.

First to second shift valve

A shift valve assembly indicated generally at 205 used to control shift from first to second gear includes a shift valve 206 having spaced lands 207 and 208 of different diameter. Land 207 is of greater diameter than land 208 to provide a thrust on the valve tending to maintain the valve in its upshift position once the valve has moved to such position. A third land 214 of greater diameter than land 207 is responsive to pressure from low range passage 124 and tends to bias valve 206 towards its upshift position when manual valve 150 is moved to its low range position. Five ports 209, 210, 211, 212 and 213 are associated with valve 206. Port 209 connects to governor pressure delivery passage 122 and admits governor pressure to the end of land 208 tending to bias the valve from its downshift to its upshift position. Port 210 connects to exhaust. Port 211 connects to a second to third drive pressure delivery passage 127. Port 212 connects to drive oil supply passage 121. Port 213 connects to low range pressure passage 124.

A first to second regulator plug 215 is disposed in axial alignment with shift valve 206, there being a spring 216 disposed between the plug and valve tending to bias the valve and plug into spaced relationship with respect to each other. Plug 215 is provided with four lands 217, 218, 219 and 220 of different diameter. Land 218 is larger than land 217, land 219 is larger than 218, and land 220 is larger than 219. Regulator plug has five ports 221, 222, 223, 224 and 225 associated therewith. Ports 223 and 224 are connected to each other by a passage 226. Ports 221 and 222 both connect to a shift modulator pressure supply passage 129. Port 225 connects to a detent pressure passage 128. An additional port 227 adjacent spring 216 connects the space between the adjacent ends of the regulator plug and valve to exhaust.

Second to third shift valve

A second to third speed shift valve indicated generally at 230 includes lands 231, 232, 233, 234 and 235. Land 232 is larger than 231, land 233 is larger than 232, land 234 is smaller than 233, and land 235 is smaller than land 234. Six ports 236, 237, 238, 239, 240 and 241 are associated with shift valve. Port 236 admits governor pressure from governor pressure delivery passage 122 to the end of land 231. Port 237 connects to a passage 131 leading to a second gear drive overrun band servo 310 to apply brake band 60. Port 238 connects to reverse pressure supply passage 125. Port 239 connects to a direct drive oil delivery passage 132 leading to the chamber 55 of the direct drive clutch 38–39 to apply the clutch. Port 240 connects to second to third gear pressure passage 127 which is supplied with fluid when the first to second shift valve is in its upshift or second gear drive position. Port 241 connects to detent passage 128. A second to third gear shift valve regulator plug indicated generally at 242 includes three lands 243, 244 and 245. Land 244 is larger than land 243 and land 245 is larger than land 244. A spring 246 seated on the valve housing biases shift valve 230 towards its right-hand or downshift position. Two ports 247 and 248 are associated with regulator plug 242. Port 247 connects to line pressure supply passage 120. Port 248 connects to shift modulator passage 129.

Detent valve

A detent valve 250 includes a pair of spaced lands 251 and 252 and four ports 253, 256, 257 and 258. Port 253 connects to a branch passage 120A of line pressure supply passage 120. Port 256 connects to vacuum modulator pressure delivery passage 123. Port 257 connects to a shift modulator pressure passage 130 leading to a port 283 of a modulator pressure cutoff valve 275. Port 258 connects to detent passage 128.

A detent regulator valve indicated generally at 260 includes four spaced lands 261, 262, 263 and 264. A pin 265 is disposed in the valve bore at one end of the valve. A spring 266 seated on land 264 biases the detent regulator valve toward its right-hand position. Five ports 253, 267, 268, 269 and 270 are associated with regulator valve 260. Ports 258 and 268 connect to detent passage 128. Port 267 connects to drive range pressure supply passage 121. Ports 269 and 270 connect to low range pressure passage 124.

Modulator pressure cutoff valve

A modulator pressure cutoff valve which may be termed a third to second valve indicated generally at 275 includes a movable valve member having lands 276, 277 and 278. Lands 276 and 277 are of equal diameter and land 278 is of smaller diameter than lands 277 and 276 and also of smaller diameter than the valve bore. Four ports 280, 281, 282 and 283 are associated with the valve. Port 280 connects to direct drive clutch passage 132. Passage 132 receives line pressure from the second to third shift valve 230 when the shift valve is in its upshift position and is connected to exhaust by the second to third shift valve when the shift valve is in its downshift position. Port 281 is connected to detent passage 128. In drive range, normal operation detent passage 128 is connected to exhaust. In drive range detent operation, pressure at a fixed pressure less than line pressure, for example 56 p.s.i., is delivered to detent passage 128 by detent pressure regulator valve 260. In manual low range operation, full line pressure is delivered to detent passage 128. Port 282 connects to shift modulator pressure passage 129. Port 283 connects to shift modulator pressure passage 130.

In normal drive range operation, second gear drive passage 132 will be connected to exhaust by the second to third gear shift valve, through ports 239, 238 and reverse passage 125. A spring 279 will bias valve 275 to its right-hand position to admit modulator pressure from passage 130 to passage 129 so that the modulator pressure is effective upon the regulator plugs of the first to second and second to third shift valves tending to downshift the shift valves.

In the event of a shift from second to third gear, valve 230 will direct line pressure passage 132 and this pressure acting on land 276 of valve 275 will tend to move valve 275 to block off passage 130 and connect passage 129 to exhaust through ports 282, 281 and detent passage 128. At the same time, however, spring 279 and modulator pressure from passage 130 act to bias the valve toward a position wherein the valve is effective to connect passage 130 to passage 129 and block off detent passage 128. Thus, in drive range, third gear drive, at light throttle, light torque demand condition, the modulator pressure which is relatively low plus force of spring 279 will not be sufficient to overcome the effect of line pressure from passage 132 acting on land 276 and the valve will move against spring 279 to connect modulator passage 129 to exhaust. At heavy throttle, heavy torque demand condition of operation, modulator pressure in passage 130 will be relatively high so that this pressure plus the force of spring 279 will be effective to move valve 275 to connect passage 130 to passage 129. This is to permit a heavy throttle forced downshift from third to second prior to detent operation and to prevent hunting of the second to third shift valve after a light throttle upshift from second to third.

In the event that a detent downshift from third to second is called for, detent pressure at a fixed pressure of 56 p.s.i. will be admitted to detent passage 128. Also in detent operation, modulator pressure in modulator passage 130 will be equal to detent pressure or 56 p.s.i. This is because the detent passage is the exhaust passage for the modulator valve. In detent operation, modulator pressure and detent pressure are the same. Thus, for detent operation, detent pressure or modulator pressure at a fixed 56 pounds will be delivered to passage 129 irrespective of the position of valve 275.

*First to second accumulator control valve*

An accumulator control valve indicated generally at 285 includes spaced lands 286, 287 and 288. Lands 286 and 287 are of equal diameter and larger diameter than land 288. A spring 289 seated on a plug 290 biases the valve toward one end of its limit of travel or toward the left as illustrated in FIGURE 1b. Five ports 291, 292, 293, 294 and 295 are associated with the valve. Ports 291 and 293 connect to an accumulator control valve pressure delivery passage 134. Port 292 connects to a low range pressure passage 124. Port 294 connects to drive range pressure supply passage 121. Port 295 connects to detent pressure delivery passage 128.

With the manual valve 150 positioned for drive range operation line pressure is supplied through passage 121 to port 294 and low range passage 124 is connected to exhaust through port 166 of the drive range selector valve. In normal drive range operation, detent passage 128 is connected to exhaust through ports 268, 269 of detent regulator valve 260 and low range passage 124. Due to the differential area of lands 288 and 287, valve 285 regulates the pressure delivered to passage 134 at a predetermined differential pressure less than line pressure, for example, 35 p.s.i. less than line. Low range passage 124 provides for exhaust of this excess pressure to enable valve 285 to act as a pressure reducer valve.

In drive range detent operation, which occurs at an accelerator pedal position past full throttle under maximum horsepower conditions of operation, detent pressure in passage 128 acts on the end of land 288 to boost the pressure delivered by valve 285 to passage 134. In drive range detent operation, the detent pressure delivered to passage 128 is a fixed pressure less than line pressure, for example, 56 p.s.i. Whereas, in normal drive range operation the pressure delivered by valve 285 to passage 134 is a predetermined pressure less than line pressure, for example, 35 p.s.i. less than line pressure, the pressure delivered to passage 134 in drive range detent operation will still be less than line pressure, but will be a higher pressure than that 35 pounds differential.

In normal low range operation, low range passage 124 will be supplied with fluid from the drive range selector valve. In this event, the accumulator control valve has no exhaust port and cannot regulate. Pressure delivered to passage 134 in low range operation will be full line pressure.

*Detent control valve*

A detent control valve or solenoid valve 296 includes a movable valve member 297 normally spring biased by a spring (not shown) to block off a restricted port 298 connected to line pressure supply passage 120. A wire 299 connects the solenoid of valve 296 to a switch contact 300 of a switch 301. A contact 302 may be moved by an accelerator pedal 305 to connect contact 300 to a contact 303 connected to a battery 304. Contact 302 is normally open and is closed only when the accelerator pedal is depressed to a so-called detent position which occurs only after the vehicle carburetor has first been fully opened to provide full engine power.

*Low range and reverse band servo*

A low and reverse band servo 320 is used to apply brake band 79 when the transmission is operated in low forward drive or reverse drive.

Servo 320 includes a housing 321 having a band apply piston 322 fixed to a band actuating stem 323. Stem 323 is connected to actuate band 79 by means of suitable linkage, not shown. A spring 324 yieldably biases piston 322 to its band release position. An accumulator piston 325 is carried by stem 323 and is movable with respect to stem 323 between stops 326 and 327 fixed to stem 323. A spring 328 yieldably biases accumulator piston 325 toward contact with stop 326. Piston 325 includes a center annular cylindrical portion 329 contacting stem 323 and an elongated annular recess 330 formed in section 329 adjacent to stem 323. A passage 331 is provided through annular cylindrical portion 329 to the recess chamber 330. A passage 332 and a restriction 333 in stem 323 connect a chamber 334 beneath piston 322 to the elongated recess 330. When the accumulator piston 325 is positioned in contact with stop member 326, the accumulator piston will block off passage 332 from annular recess chamber 330. In the event that accumulator piston 325 moves relative to stem 323 toward stop 327, recess chamber 330 will register with restriction 333 to hydraulically connect passage 332 with recess chamber 330 and connect a band release chamber 335 to band apply chamber 334. When operating in drive range the accumulator valve 285 delivers a reduced line pressure to a chamber 336 separated from chamber 335 by a cylindrical wall 337 formed on the servo housing 338. This reduced pressure in chamber 336 acts on piston 325 to move the piston against spring 328 to position the piston to initially establish a hydraulic connection from chamber 334 to chamber 335 through stem passage 332, restriction 333, chamber 330, and passage 331 in piston 325. The accumulator piston 325 in the low and reverse servo is used to cushion the shift between first and second gear by cushioning engagement of the second gear disc brake 65–66. As stated, chamber 336 is connected to accumulator control passage 134, chamber 335 is connected to passage 133 leading to chamber 68 of disc brake piston 67, and chamber 334 is connected to low and reverse band apply passage 126.

*Ball valves*

Four ball valves are shown in the system, three of which are subject to direction of fluid flow to render associated fixed restrictions effective or ineffective in response to direction of fluid flow for timing purposes. One ball valve is subject to direction of fluid flow solely for the purpose of establishing connections between passages.

The timing valves are shown at 340, 345 and 350. Timing ball valve 340 is disposed in direct drive clutch passage 132 and includes an unrestricted port 341 and a restriction 342 disposed hydraulically in parallel relationship. A ball 343 either blocks off port 341 to render restriction 342 effective or opens port 341 to render restriction 342 ineffective depending upon the pressure beneath the valve. In the event of an upshift from second gear to direct drive, fluid pressure will be admitted to passage 132 through the second to third shift valve 230. Ball 343 will lift off of port 341 to by-pass restriction 342. In the event of a downshift from direct drive to second gear drive, valve 230 will connect passage 132 to exhaust and ball 343 will seat on port 341 to render restriction 342 effective to delay release of direct drive clutch 38–39.

Ball valve 345 is used to control the rate of fluid flow between passage 127 and passage 133. Valve 345 includes an unrestricted port 346, a restriction 347 and a ball 348. Upon a shift from first gear drive to second gear drive, the first to second shift valve delivers pressure to passage 127. With fluid flowing from passage 127 to the second gear brake apply passage 133, ball 348 will seat in port 346 to render restriction 347 effective. With the flow of fluid to passage 133 restricted, the brake action of second gear brake piston 67 is cushioned to provide smooth engagement of brake discs 65–66.

Ball valve 350 is disposed between passage 133 and passage 131 for restricting the rate of flow from passage 133 to passage 131. Valve 350 includes an unrestricted port 351, a restriction 352 and a ball 353. With pressure flowing from passage 133 to passage 131, ball 353 will seat on port 351 to render restriction 352 effective. This restriction delays application of the second gear overrun band 60 until after the second gear disc brakes 65–66 have first been engaged.

A fourth ball valve 355 controls the flow of fluid between low range pressure passage 124 and the low and reverse pressure passage 126 and between reverse pressure passage 125 and the low and reverse passage 126. Ball valve 355 includes a port 356 connected to low range passage 124, a port 357 connected to reverse passage 125, a port 358 connected to low and reverse passage 126, and a ball 359. When operating in low range, ball 359 will be moved by pressure from passage 124 to open port 356 and block off port 357 to connect passage 124 to passage 126 and block off passage 125. When operating in reverse, ball 359 will be moved by pressure from passage 125 to connect passage 125 to passage 126 and block off passage 124.

*Operation drive range*

With manually operable drive range selector valve 150 positioned for drive range operation, line pressure from passage 120 is admitted to drive range passage 121 through ports 162 and 163. Reverse passage 125 is connected to exhaust through ports 161 and 160. Low range passage is connected to exhaust through port 166 and the end of the valve bore.

Line pressure is supplied by passage 120 to port 253 and the end of land 251 of detent valve 250 moving the valve against spring 266 to its left-hand position, shown. Valve member 297 of detent control valve 296 normally blocks off port 298 to prevent drop of pressure in passage 120. Line pressure from passage 120 is supplied to port 190 of the vacuum modulator valve 170, and to port 247 at the end of land 243 of the second to third shift valve modulator plug 242 to bias the second to third shift valve 230 to its second speed or downshift position.

Drive pressure supply passage 121 conducts line pressure to governor 200, to port 294 of the first to second accumulator control valve 285, to port 267 of detent regulator valve 260, and to port 212 of the first to second shift valve 205. Drive passage 121 also delivers line pressure to chambers 40 and 41 of forward drive clutch 33–34 to engage the clutch. Due to restriction 43, the fluid will initially be delivered to the relatively small clutch chamber 40 through passage 42 to move the piston 36 to initial contact with clutch discs 33 and to provide initial engagement of clutch discs 33–34. This initial engagement of the discs will be smooth and gentle. As resistance to movement of the piston 36 rises due to engagement of the discs, pressure will rise in chamber 41 to maintain the discs engaged. In this manner smooth engagement of the discs 33–34 is accomplished without "bump" and adequate torque transmitting capacity is obtained.

With clutch 33–34 engaged, one-way brake 82 locks up to prevent rotation of planet carrier 77 and first gear drive is obtained through the planetary gearing as heretofor explained. The combination of the particular clutch servo arrangement for clutch 33–34 described and the one-way brake 82 provides for very smooth clutch engagement and conditioning of the transmission for forward drive, and is particularly effective upon shift from neutral to drive range operation.

In drive range operation, the detent valve 250 is normally biased to its left-hand position against the force of spring 266 by line pressure from passage 120 acting on the end of land 251. With the detent valve so positioned, modulator pressure from passage 123 is conducted through ports 256 and 257 to passage 130 to port 283 of the third to second downshift valve 275. In all speeds except direct drive valve 275 is biased by spring 279 to connect port 283 to port 282 to permit modulator pressure to pass to passage 129 connected to the modulator plugs of the first to second and second to third shift valves 206 and 230, to yieldably bias the shift valves to their downshift position.

Detent pressure delivery passage 128 is normally connected to exhaust by ports 268, 269 of detent regulator valve 260 and low range passage 124. The detent passage 128 comprises the exhaust passage for excess fluid from modulator valve 170.

At some vehicle speed, depending upon throttle opening, governor pressure acting upon the end of land 208 will cause the first to second shift valve 206 to move to its left-hand or upshift position wherein drive pressure supply passage 121 is connected to second and third gear drive passage 127 through ports 212 and 211 of the first to second shift valve. Passage 127 leads to pressure supply port 240 of the second to third gear shift valve 230 and to ball valve 345. Ball valve 348 of valve 345 will block off port 346 to render restriction 347 effective. Fluid pressure will be supplied to passage 133 through restriction 347. Passage 133 leads to chamber 68 of second gear disc brake 65, 66 to engage the disc brake, to chamber 335 of accumulator piston 325 and to ball timing valve 350. Due to the effect of restriction 347 of ball timing valve 345 and due to the action of accumulator piston 325, second gear disc brake 65–66 will be smoothly and gradually engaged. Considering the condition of the accumulator piston 325 at the moment before the first to second shift valve is upshifted from its downshift position, the first to second gear accumulator control valve 285 is effective to deliver reduced line pressure from drive pressure supply passage 121 to the first to second gear accumulator passage 134 by way of ports 294 and 293 of valve 285. In drive range operation this pressure will be 35 p.s.i. less than line pressure. This pressure, admitted to the end of land 286 through port 291 assists spring 289 to move the valve to a position wherein it tends to block off port 293 from port 294 and to connect port 293 to port 292 connected to low range passage 124. With manual valve 150 positioned for drive range, passage 124 is connected to exhaust through port 166 of valve 150. First to second accumulator control valve 285 acts as a pressure reducing valve which maintains a pressure 35 p.s.i. less than line pressure in passage 134 when operating in drive range. It will be apparent therefore, that prior to movement of the first to second shift valve to its upshift position, spring chamber 335 will be connected to exhaust through passage 133, valve 345, passage 127 and ports 211 and 210 of shift valve 206. The reduced pressure acting on piston 325 will cause the piston to stroke on stem 323 against spring 328 toward stop member 327. With the introduction of full line pressure which may be of the order of 100 p.s.i. to chamber 335, piston 325 will be forced downwardly on stem 323 toward stop member 326. During this stroking movement, limited fluid leakage through port 331, restriction 333 and stem passage 332 is had to chamber 334. Chamber 334 at this time is connected to exhaust through passage 126 and either low range pressure passage 124 or reverse passage 125 depending upon the position of ball valve 355. The combination of restriction 347 controlled by ball valve 345, the accumulator piston 325 controlled by the first to second gear accumulator control valve 285 and the fluid leakage controlled by restriction 333 in stem 323 provides for smooth engagement of second speed disc brake 65–66 without torque reaction bumps. With disc brake 65–66 engaged, the one-way brake 63, in series with the disc brake 65–66 is rendered effective to establish second gear drive. It will be understood that with only disc brake 65–66 and forward clutch 33–34 engaged, the one-way brake 63 will provide free-wheeling on overrun in second gear drive.

In order to provide for second gear overrun braking, the brake band 60 is engaged subsequent to engagement of the disc brake 65–66. Fluid pressure from passage 133 is conducted to overrun band servo 310 through ball valve 350 and passage 131 to apply band 60. In accomplishing the first to second gear shift ball 353 blocks off port 351 to render restriction 352 effective. This delays the application of band 60 until after engagement of disc brake 65–66 and one-way brake 63 to prevent rotation of clutch drum 52. Thus band 60 is applied to drum 52 after rotation of the drum has ceased, thereby eliminating any torque reaction bump in applying the band 60. Band 60 is solely for overrun second gear braking and is not required for the establishment of second gear drive. Passage 131 is also connected to port 237 of the second to third speed shift valve 230 and acts on land 232 in assistance to governor pressure tending to upshift the shift valve 230 once second gear drive has been established. This is necessary in order to enable governor pressure to upshift the second to third speed shift valve 230.

To accomplish an upshift from second gear drive to direct drive, direct drive clutch 38–39 is engaged and second gear overrun band 60 is released.

At some vehicle speed governor pressure acting upon land 231 and line pressure acting upon land 232 of the second to third shift valve 230 will be effective to move the valve to its upshift or direct dive position. With valve 230 upshifted, fluid pressure is admitted from passage 127 to passage 132 by way of ports 240 and 239 of valve 230. This pressure in passage 132 is conducted to port 280 of the third to second downshift valve 275 where it acts on land 276 to move the valve to the left against spring 279 to block off port 283 from port 282 and to connect modulator pressure passage 129 to exhaust through ports 282, 281 and detent passage 128. Detent passage 128 is connected to exhaust through ports 268 and 269 of detent regulator valve 260 and low range passage 124 and port 166 of manual valve 150. Thus, at light throttle operation in direct drive, drive range operation, the modulator pressure has no effect on the first to second and second to third shift valves. Modulator pressure, however, is maintained effective in chamber 105 of the line pressure regulator valve to vary line pressure.

Line pressure from passage 132 is conducted through ball valve 340 to that portion of passage 132 leading to the relatively small chamber 55 of direct drive clutch piston 54, and to band release chamber 315 of the overrun band apply servo 310 to release band 60. In applying clutch 38–39, ball 343 will be off of seat 341 to permit unrestricted flow through the valve. Fluid pressure in chamber 315 of servo 310 will assist spring 313 to force piston 312 downwardly against the force of band apply pressure in chamber 316 to release band 60. In this manner the release of band 60 is timed to the engagement of direct drive clutch 38–39 and the overrun band servo acts as an accumulator on a second to third upshift to provide smooth engagement of clutch 38–39.

Considering a normal closed or part throttle downshift from third to second gear drive, at some relatively low vehicle speed, line pressure acting on the end of land 243 of the second to third shift valve 230 will be effective to overcome the effect of line pressure acting on land 232 and governor pressure acting on land 231 to move valve 230 to its downshift or second speed position. The valve will thereupon be effective to block off port 240 and connect passage 132 to exhaust through ports 239, 238, reverse passage 125 and ports 161, 160 of manual valve 150. In accomplishing exhaust of passage 132, ball 343 of timing valve 340 will block off port 341 to render restriction 342 effective. This restriction 342 slows up the rate of engagement of overrun band 60 to avoid any harsh torque reaction bumps. It will further be noted that on such a normal downshift from third to second gear drive port 280 of the third to second downshift valve 275 is connected to exhaust on the downstream side of restriction 342 to permit rapid exhaust of fluid from the end of land 276. The third to second downshift valve 275 then admits modulator pressure from passage 130 to passage 129 so that this pressure is again effective upon both regulator plugs of both shift valves. This prevents hunting of the valves.

On a normal closed or part throttle second to first gear downshift, the first to second shift valve will at some vehicle speed downshift to its first gear drive position. Upon movement of the first to second shift valve 206 to its downshift position, drive passage 121 and port 212 will be blocked off by land 207. Passage 127 will be connected to exhaust by way of ports 211 and 210. Passage 133 leading to chamber 68 of piston 67 will be connected to exhaust through ball valve 345, passage 127 and ports 211 and 210 of shift valve 206. It will be noted on this downshift both ball 348 of ball valve 345 and ball 353 of ball valve 350 are unseated so that the restrictions 347 and 352, respectively, are not effective. Since the one-way brake 82 is relied upon for first gear drive, rapid release of disc brake 65–66 and second gear overrun band 60 can be accomplished without torque reaction bumps.

*Detent downshifts*

In addition to the normal or part throttle upshifts and downshifts heretofore described, so-called detent or past full throttle forced downshifts which call for downshift under full power for rapid vehicle acceleration may be had. Upon depressing the accelerator pedal 305 past full throttle position for maximum acceleration, switch 302 is closed to energize solenoid valve 296 to move plunger 297 away from exhaust port 298 to drop the line pressure in branch passage 120A acting on the end of land 251 of detent valve 250. Restriction 298A prevents complete loss of line pressure in passage 120 and also permits drop of pressure in passage 120A, thereby permitting spring 266 to move the detent regulator valve 260 and detent valve 250 to their right-hand so-called detent position.

Considering the position of the detent valve 250 and detent pressure regulator valve 260 prior to detent position of the accelerator pedal, or their normal left-hand position, the detent passage 128 connected to port 192 of modulator valve 170 serves as an exhaust passage for the modulator valve 170 and is connected to exhaust through ports 268, 269 of detent regulator valve 260 through low range passage 124 and port 166 of manual valve 150. This permits modulator valve to function in the manner heretofore described. With the detent valve 250 and detent regulator valve 260 in their right-hand or detent position, port 269 is blocked off by land 264, line pressure from passage 121 is admitted to detent passage 128 by way of ports 267 and 268 of detent regulator valve 260. Passage 128 also connects to port 258 such that this pressure is effective on the end of land 252 of the detent valve and land 261 of the detent regulator valve. This biases the detent regulator valve 260 against spring 266 such that the detent regulator valve 260 maintains both the detent pressure in passage 128 and modulator pressure in passage 123 at a fixed regulated passure less than line pressure, for example, 56 p.s.i. when operating in drive range detent operation. This regulated detent pressure is admitted through port 258 to the valve bore adjacent the end of land 261 and land 252. This pressure moves the detent valve to its extreme right-hand or downshift detent position, and the detent regulator valve will be out of contact with the detent valve.

In drive range operation there is no pressure in detent passage 128 except when operating in detent. In drive range when operating in detent the modulator pressure in modulator passage 123 will never be less than detent pressure or 56 p.s.i., because the exhaust of excess pressure to the detent passage 128 and hence to the low range passage 124 is controlled by the detent regulator valve 260 at 56 p.s.i.

During a third to second detent downshift, the third to second downshift valve 275 has no function. Since the shift modulator pressure admitted to shift modulator pressure passage 130 through ports 256 and 257 of detent valve 250 and the detent pressure in passage 128 through ports 267 and 268 of detent pressure regulator valve 260 are both the same pressure or 56 p.s.i., the pressure in shift modulator pressure passage 129 will be a constant 56 p.s.i. irrespective of the position of the third to second downshift valve 275. It will be apparent that either this fixed detent pressure from passage 128 or the fixed 56 p.s.i. pressure from passage 130 will be admitted to passage 129. In the case of the second to third shift valve this fixed pressure will assist line pressure acting on land 243 to move the second to third shift valve regulator plug 242 and shift valve 230 to its downshift position. It will further be apparent that this fixed pressure will act on the first to second shift valve regulator plug tending to bias valve 206 to its downshift position.

If the accelerator pedal is relaxed to open switch 302 the third to second shift valve again becomes effective. In third gear or direct drive, light throttle operation, the pressure in passage 132 will move valve 275 against spring 279 to connect passage 129 to exhaust through ports 282, 281, detent passage 128 and ports 268 and 269 of detent regulator valve 260 and low range passage 124. At heavy throttle (prior to detent) the third to second downshift valve will be biased by modulator pressure in passage 130 and by spring 279 to admit modulator pressure from passage 130 to passage 129 tending to downshift the third to second shift valve 230. Thus in normal operation prior to detent operation, valve 275 serves to cut off modulator pressure to the second to third shift valve when operating in direct drive, light throttle. However, when operating in direct drive heavy throttle, valve 275 is positioned to admit modulator pressure to the third to second shift tending to downshift the valve.

In detent operation the fixed 56 p.s.i. detent pressure biases the first to second and second to third shift valves toward their downshift position unaffected by change of altitude to prevent drop of detent downshift pressure to undesirably low values at high altitudes. This gives a second to first gear detent downshift at a fixed vehicle speed, for example, 25 miles per hour regardless of altitude.

Low range operation

With the drive range selector valve 150 positioned for low range operation, line pressure is admitted to low range pressure passage 124 through ports 163, 164 and exhaust port 166 is blocked off by land 152.

Line pressure in passage 124 is conducted to port 213 of the first to second shift valve 206 where it acts on land 214 and tends to move the valve from its downshift to its upshift position. Passage 124 admits line pressure through port 270 of detent regulator valve 260 so that the whole assembly is moved to the right-hand position such that line pressure from drive passage 121 is admitted through ports 267 and 268 to detent passage 128. Thus, in low range operation, both the detent pressure in passage 128 and modulator pressure in passage 123 become line pressure, rather than 56 p.s.i. as was the case when operating in drive range detent operation. Low range oil in passage 124 is conducted through ball valve 355 to passage 126 to chamber 334 of the low and reverse band servo to apply band 79. Ball 359 will block off port 357 to prevent loss of line pressure through reverse passage 125. Line pressure is also conducted through passage 124 to port 292 of the first to second accumulator control valve 285 to cause valve 285 to deliver full line pressure through passage 134 to one side of band apply piston 322 and to accumulator piston 325. In low range, line pressure in detent passage 128 is also conducted to port 225 of the first to second gear shift valve assembly to bias the shift valve to its downshift position such that the second to third gear drive passage 127 is connected to exhaust through ports 211 and 210. Due to the action of line pressure acting on accumulator piston 325, the piston will permit restricted leakage of band apply oil from 334 beneath band apply piston 322 through passage 332, restriction 333, port 331 to chamber 335 during the interval of stroking action of piston 332. Passage 133 connected to chamber 335 permits exhaust of fluid from chamber 335 by way of ball valve 345, passage 127 and ports 211 and 210 of shift valve 206. This oil leakage and accumulator piston action cushions and prevents slamming on of the band 79 for smooth shift into low. With the band engaged, piston 325 will be moved against stop 327 and further leakage through passage 332 will be blocked.

In low range operation, the modulator pressure admitted to passage 129 by valve 275 is full line pressure, the same as detent pressure in passage 128. Thus, in low range operation, line pressure from low range passage 124 acts on the first to second shift valve tending to upshift the valve and line pressure in passage 129 acts on the valve tending to downshift the valve. The low range (line pressure) oil in passage 124 is applied to the shift valve in order to make possible a desired upshift from first to second when operating in low range. This is desirable in order to protect the transmission against a downshift to first gear at too high a vehicle speed. In case the drive range valve 150 is moved from drive range to low range when the vehicle is operating at a speed above a predetermined vehicle speed, for example, 25 miles per hour, the transmission will not downshift to first gear.

Reverse

With manual valve 150 positioned for reverse operation, drive range passage 121 and low range passage 124 are connected to exhaust through ports 165 and 166. Line pressure supply passage 120 is connected to reverse passage 125 by way of ports 162 and 161.

Line pressure in reverse passage 125 is conducted to the large area chamber 56 of the direct drive clutch servo to engage clutch 38–39, and through ball valve 355 to passage 126 to chamber 334 of the low and reverse servo to apply band 79. Ball 359 will block off low range passage 124 at port 356 to prevent loss of line pressure through passage 124. Reverse oil is also conducted through passage 125 to port 104 of the line pressure regulator valve assembly to boost the line pressure, and is conducted to port 238 of the second to third shift valve 230. With valve 230 in its downshift position, line pressure is admitted through ports 238 and 239 to passage 132, through ball valve 340 and to chamber 55 of the clutch servo of clutch 38–39. Thus, in reverse operation, both chambers 56 and 55 are supplied with line pressure to engage clutch 38–39. This provides for high torque transmitting capacity in a relatively small size clutch.

Line pressure regulator

As has heretofore been stated modulator pressure from passage 123 is applied through passage 123 to chamber 105 of the line pressure regulator plug to vary line pressure as a function of torque demand and vehicle speed. Modulator pressure in passage 123 will be maximum at low vehicle speed with wide open engine throttle. Modulator pressure will decrease as the engine throttle is moved toward a closed position and will decrease in response to vehicle speed. When operating in drive range, modulator pressure in passage 123 will vary such that line pressure supplied to passage 120 will vary between 70 and 150 p.s.i.

As heretofore explained, when operating in manual low range, modulator pressure becomes full line pressure. In manual low range, the line pressure delivered by the line pressure regulator valve is a constant 150 p.s.i.

In reverse, both reverse oil from passage 125 and modulator pressure from passage 123 act on the line pressure regulator valve, such that line pressure delivered by the pressure regulator valve will vary between 175 and 230 p.s.i.

We claim:
1. In a transmission of the type having friction gripping elements adapted to be engaged and released to establish changes of transmission drive ratio, a servo having a piston and a servo chamber adapted to receive fluid pressure for engaging said friction gripping elements, a fluid pressure source providing line pressure, a drive range selector valve, a shift valve, an accumulator, an accumulator control valve, said accumulator including an accumulator piston having first and second chambers at opposite sides of said piston adapted to receive fluid pressure, a stem extending through said piston, a third chamber, a passage in said stem connected to said third chamber and controlled by said piston, a passage through said piston for at times connecting said third chamber to said second chamber through said stem passage, said piston being movable with respect to said stem to block off fluid flow between said first and third accumulator chambers, a passage connecting said drive range selector valve to said fluid pressure source, a passage for supplying line pressure to said shift valve and to said accumulator control valve controlled by said drive range selector valve and supplied with line pressure when said drive range selector valve is positioned for drive range operation, a passage connecting said accumulator control valve to said first accumulator chamber, said accumulator control valve being effective to deliver fluid pressure to said last-mentioned passage at a fixed differential pressure less than line pressure, passage means connecting said shift valve to the servo chamber of said friction gripping elements and to said second accumulator chamber, said shift valve being effective in one position to connect said last-mentioned passage means to exhaust and being movable to a second position to connect said last-mentioned passage means to said fluid pressure source when said drive range selector valve is positioned for drive range operation.

2. In a transmission of the type having friction gripping elements adapted to be engaged and released, a fluid pressure responsive servo having a piston and a chamber adapted to receive fluid pressure for engaging said friction gripping elements, a fluid pressure source, means for controlling engagement and release of said friction gripping elements including a drive range selector valve and a shift valve, said drive range selector valve being movable from a drive range position to a low range position, a passage connecting said pump to said drive range selector valve, a second servo motor having an accumulator piston and a servo piston therein, a first chamber in said servo motor between said pistons, a second chamber in said servo motor at one side of said servo piston and a third chamber in said servo motor at the side of said accumulator piston opposite said first chamber, passage means for permitting restricted fluid flow between said second and third chambers, an accumulator control valve for controlling said accumulator, a first passage connecting said drive range selector valve to said shift valve and said accumulator control valve for delivering fluid pressure to said shift valve and said accumulator control valve when said drive range selector valve is positioned for either drive range or low range operation, a second passage connecting said drive range selector valve to said accumulator control valve and connected to exhaust when said selector valve is positioned for drive range, an accumulator control valve pressure delivery passage connecting said accumulator control valve to said first chamber of said second servo motor, said accumulator being effective to deliver a pressure which is reduced by a predetermined amount from line pressure to said accumulator control valve pressure delivery passage when said drive range selector valve is positioned for drive range operation and effective to deliver full line pressure to said accumulator control valve pressure delivery passage when said selector valve is positioned for low range operation, and shift valve pressure delivery passage means connecting said shift valve to said second chamber adjacent said accumulator piston and to said chamber of said servo for said friction gripping elements, said shift valve being effective in one position thereof to connect said last-mentioned passage means to exhaust and being movable to a second position to connect said last-mentioned passage means to said fluid pressure source.

3. In a transmission of the type having first and second friction gripping members adapted to be engaged and released, a first servo motor having a piston and a chamber adapted to receive fluid pressure for engaging said first friction gripping members, a second servo motor having a piston and a chamber adapted to receive fluid under pressure for engaging said second friction gripping members, an accumulator for controlling the rate of engagement of said friction gripping elements, said accumulator including an accumulator piston and a servo piston, a first chamber in said accumulator disposed between said accumulator piston and servo piston, a second chamber in said accumulator disposed on the side of said accumulator piston remote from said first chamber, a third chamber disposed on the side of said servo piston remote from said first chamber, passage means for permitting restricted fluid flow between said second and third chambers, an accumulator control valve, an accumulator control valve pressure delivery passage connecting said accumulator control valve to said first accumulator chamber, a fluid pressure source, a drive range selector valve, a shift valve, a passage connecting said pressure source to said selector valve, said selector valve being movable from a drive range position to a low range position, said shaft valve being movable from a first position to a second position, a first passage for delivering pressure from said selector valve to said shift valve and to said accumulator control valve when said selector valve is positioned either for high range or low range operation, a second passage connecting said selector valve to said accumulator control valve, said second passage being connected to exhaust by said selector valve when said selector valve is positioned for drive range operation and being supplied with line pressure when said selector valve is positioned for low range operation, said accumulator being effective to deliver pressure reduced from line pressure by a predetermined amount to said accumulator control valve delivery passage when said selector valve is positioned for drive range operation and to deliver full line pressure to said accumulator control valve delivery passage when said selector valve is positioned for low range operation, and additional passage means connecting said shift valve to said second accumulator chamber and to the chambers of both of said friction gripping servos, said shift valve being effective in one position to connect said last-mentioned passage means to exhaust and effective in a second position to deliver line pressure to said last-mentioned passage means.

4. In a transmission of the type having first and second friction gripping members adapted to be engaged and released, a rotatable member, a transmission gearing element fixed to said rotatable member for rotation therewith, a one-way brake between said first friction gripping element and said rotatable member for preventing rotation of said rotatable member in one direction when said first friction gripping element is engaged, a first fluid pressure responsive servo for engaging said first friction gripping element in response to fluid pressure supplied thereto, said second friction gripping member being effective to prevent rotation of said rotatable member in any direction when engaged, a second fluid pressure responsive servo for engaging said second friction gripping member in response to fluid pressure supplied thereto, a fluid pressure source, a drive range selector valve adapted to be positioned for drive range operation, a shift valve movable from a first to a second position, a passage connecting said source to said selector valve, a passage connecting said selector valve to said shift valve and effective to deliver fluid under pressure to said shift valve when said selector valve is positioned for drive range operation, passage means for connecting said shift valve to both of said first and second fluid pressure responsive servos, means in said passage means for restricting fluid flow from said shift valve to both of said servos, and additional means in said passage means for restricting flow of fluid from said shift valve to said second servo for delaying engagement of said second friction gripping member until after engagement of said first friction gripping member, said shift valve being effective in said first position to connect said last-mentioned passage means to exhaust and effective in said second position to deliver fluid pressure to said last-mentioned passage means.

5. In a transmission of the type having a friction gripping element adapted to be engaged and released to establish a change of drive ratio, a servo piston adapted to receive fluid pressure to engage said friction gripping element, a fluid pressure source for providing line pressure, a drive range selector valve for selecting different conditions of operation including drive range and low range, a shift valve for controlling delivery of fluid pressure to said servo piston, said shift valve being effective in a downshift position to connect said servo piston to exhaust and effective in an upshift position to deliver fluid pressure to said servo piston, an accumulator for cushioning engagement of said servo piston, said accumulator including an accumulator piston, an accumulator control valve controlled by said drive range selector valve, said accumulator including a first chamber adapted to receive fluid controlled by said accumulator control valve and a second chamber adapted to receive fluid from said shift valve, said shift valve being effective to connect said second chamber to exhaust when said shift valve is in said downshift position and effective to deliver line pressure to said second chamber when said shift valve is in said upshift position, said accumulator control valve being effective to deliver reduced line pressure to said first accumulator chamber when said drive range selector valve is positioned for drive range operation and to deliver full line pressure to said first accumulator chamber when said drive range selector valve is positioned for drive range operation.

6. In a transmission of the type having a friction gripping element adapted to be engaged and released to establish a change of drive ratio, a servo piston adapted to receive fluid pressure to engage said friction gripping element, a line pressure source, a drive range selector valve adapted to be positioned for drive range operation and low range operation, a passage connecting said drive range selector valve to said source, a shift valve movable from a downshift position to an upshift position, an accumulator including a movable piston, a first chamber at one side of said piston, a second chamber at the opposite side of said piston, an accumulator control valve for controlling fluid pressure in said first chamber, a passage connecting said drive range selector valve to said shift valve and to said accumulator control valve for supplying line pressure to said shift valve and said accumulator control valve, a shift valve delivery passage connecting said shift valve to said servo piston and to said second accumulator chamber, an accumulator control valve delivery passage connecting said accumulator control valve to said first accumulator control chamber, and an additional passage connecting said drive range selector valve to said accumulator control valve, said drive range selector valve being effective in its drive range position to connect said additional passage to exhaust and effective in its low range position to deliver line pressure to said additional passage, said accumulator control valve being effective in the drive range position of said selector valve to deliver reduced line pressure to said first accumulator chamber and effective in the low range position of said drive range selector valve to deliver full line pressure to said first servo chamber, said shift valve being effective in its downshift position to connect said shift valve delivery passage to exhaust and effective in its upshift position to deliver line pressure to said shift valve delivery passage.

References Cited by the Examiner

UNITED STATES PATENTS

| | | | |
|---|---|---|---|
| 2,548,208 | 4/1951 | Evernden | 74—732 |
| 2,756,851 | 7/1956 | Collins | 192—.052 |
| 2,832,231 | 4/1958 | Edsall | 74—472 |
| 3,000,230 | 9/1961 | Froslie | 74—472 |
| 3,205,991 | 9/1965 | Tuck et al. | 192—85 |
| 3,215,001 | 11/1965 | Zundel | 74—732 |

DAVID J. WILLIAMOWSKY, *Primary Examiner.*

J. R. BENEFIEL, *Assistant Examiner.*